United States Patent [19]

King

[11] 3,871,989

[45] Mar. 18, 1975

[54] APPARATUS FOR FLOCCULATION OF DISSOLVED SUBSTANCES

[76] Inventor: Arthur S. King, P.O. Box 5337, 9001 Rosehill Rd., Leawood, Kans. 66215

[22] Filed: Feb. 14, 1974

[21] Appl. No.: 442,495

Related U.S. Application Data

[63] Continuation-in-part of Ser. No. 298,278, Oct. 17, 1972, Pat. No. 3,801,482.

[52] U.S. Cl................. 204/299, 204/272, 204/275, 204/276
[51] Int. Cl............................ C02b 1/82, C02c 5/12
[58] Field of Search........ 204/149, 180 R, 152, 275, 204/276, 299, 272

[56] References Cited
UNITED STATES PATENTS

| | | | |
|---|---|---|---|
| 2,842,490 | 7/1958 | Friel.................................... | 204/156 |
| 2,914,453 | 11/1959 | Wennerberg....................... | 204/186 |
| 3,202,601 | 8/1965 | Green............................. | 204/186 X |
| 3,277,631 | 10/1966 | Sunnen........................ | 204/180 R X |
| 3,398,077 | 8/1968 | Crownover et al. ............ | 204/180 R |
| 3,687,834 | 8/1972 | Candor....................... | 204/180 R X |

*Primary Examiner*—John H. Mack
*Assistant Examiner*—A. C. Prescott
*Attorney, Agent, or Firm*—Schmidt, Johnson, Hovey & Williams

[57] ABSTRACT

Rapid flocculation of particles contained within fluids, such as solids dissolved in water, is caused by passing the fluid first through an electrostatic treater and subsequently through an electrolytic treater so that the fluid exposed to an electrostatic field in the first treater is then subjected to electrolysis in the second treater. No plating out of particles on the electrodes of the second treater occurs because of the residual effects on the fluid of the electrostatic treater. Alternative embodiments are adapted for pipeline connection and settling pond flotation respectively.

9 Claims, 4 Drawing Figures

APPARATUS FOR FLOCCULATION OF DISSOLVED SUBSTANCES

CROSS-REFERENCES

This is a continuation-in-part of my copending application entitled Method and Apparatus for Flocculation of Dissolved Substances, Ser. No. 298,278 filed Oct. 17, 1972, now U.S. Pat. No. 3,801,482.

This invention relates to the treatment of fluids such as water by electrical equipment and, more particularly, to an apparatus for use in causing the coagulation or flocculation of dissolved solids from a solution so that the conglomeration of particles thus formed may be readily removed from the solution by means of a filter or settling basin or the like.

The treatment of fluids, such as water, with electricity, either by an electrostatic field or by electrolysis, is not per se new. For example, various types of electrolytic treaters have been developed in the past in which a current flow is established through a medium to be treated in order to attract charged impurity particles within the medium to one or the other of two oppositely charged electrodes of the treater. In this manner, the impurity particles which would otherwise plate out on metallic surfaces of equipment downstream from the treater such as the walls of boilers and the tubes of condensers are collected instead on the charged walls or electrodes of the treater. The treater must, of course, be periodically cleaned to remove the scale which has plated out on the electrodes.

In contrast to this arrangement, my earlier U.S. Letters Patent 3,585,122, issued June 15, 1971, and entitled "Apparatus for Treatment of Fluids with Electric Fields," illustrates an example of an electrostatic treater in which at least one of the electrodes thereof is insulated from the fluid being treated so that no electrical current flows between the electrodes; the fluid is affected only by the electrostatic field established between the electrodes and not by any electron flow therebetween. Because no electrolysis occurs in the treater of my aforesaid patent, no plating out is caused on either of the electrodes of the treater. Instead, it is believed that the electrostatic field changes the orientation of the polar water molecules in such a manner that their affinity for one another and for the impurity particles is reduced to such an extent that the solvency of the water is improved. Moreover, the dissolved impurity ions are apparently neutralized so that they may combine with one another in an action resembling nucleation or coagulation, to be subsequently filtered out.

While the treater of my aforesaid patent has proven to be extremely successful and has been employed in a large variety of situations in which fluids of differing characters have existed, it has now been discovered that the nucleation action initiated in the electrostatic treater may be materially accelerated by coupling an electrolytic treater in series with the electrostatic treater downstream from the latter which subjects the electrostatically treated fluid to electrolysis. Amazingly, subjecting the fluid to electrolysis after it has first been subjected to an electrostatic field does not cause plating out of the impurity ions as would be the case if the electrolytic treater were used alone. Instead of plating out on either or both of the electrodes of the electrolytic treater, as was the case with previous systems employing electrolysis, the impurity particles continue their nucleation at a more rapid rate than with the electrostatic treater alone such that flocculation of the particles occurs, allowing the resulting cluster, conglomeration or aggregate to readily be filtered or settled out.

Accordingly, it is one important object of the present invention to improve upon the teachings of my U.S. Pat. No. 3,585,122 patent by coupling an electrolytic treater in series with the electrostatic treater disclosed in said patent downstream from the electrostatic treater to materially increase the rate of nucleation and flocculation of particles contained within the fluid to be treated, all without causing plating out of the particles on the electrodes of either treater.

Another important object of the instant invention is to provide fluid treating apparatus as set forth above in which the residual effects of the apparatus on the fluid being treated are sufficiently strong that treatment of a main stream of fluid may be carried out by exposing only a relatively small, secondary stream of the fluid to the series-connected treaters of the apparatus, with the treated secondary stream subsequently being discharged into the main stream for mixture therewith. This ability has particular utility in water purification systems wherein it would be impractical or undesirable to construct treaters having sufficient capacity to handle the large, main water lines of large towns and cities.

An additional important object of the present invention is to provide series-connected electrostatic and electrolytic treaters in which the electrolytic treater is designed for flotation so that it may be conveniently located within a settling pond or the like for the fluid to be treated.

A further important object of the invention is to mount both of the series-connected electrostatic and electrolytic treaters on a single flotation member so that the system is made into an essentially self-contained unit that can be readily handled, installed, and operated within a settling pond or the like.

Yet another important object of the present invention is to maintain maximum exposure of the fluid to the fields of the treaters by causing the fluid to follow time-consuming, spiral paths through the treaters instead of more rapid, straight-line paths.

Figure 1:
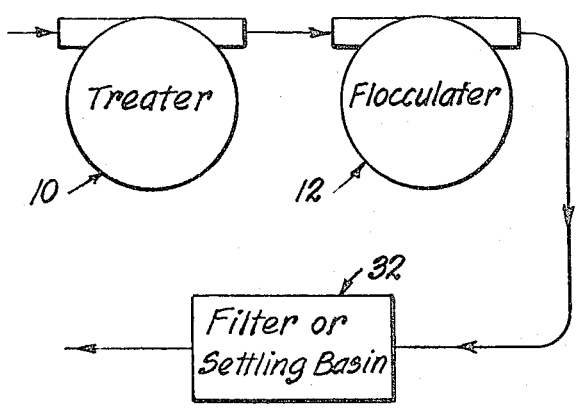
FIG. 1 is a diagrammatic view illustrating three stages of the treating process contemplated by the present invention.
Figure 2:
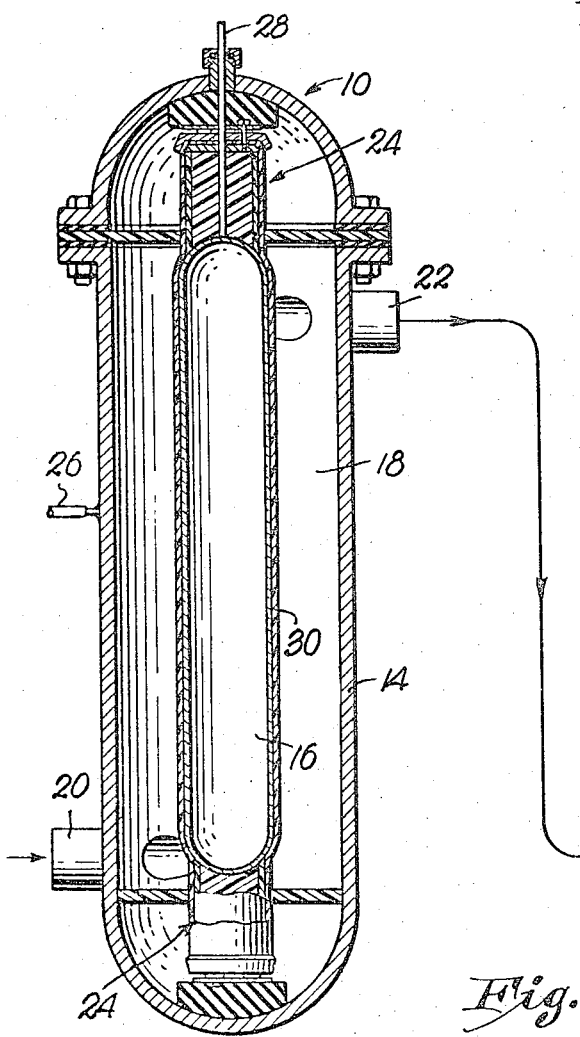
FIG. 2 is a vertical cross-sectional view of illustrative embodiments of an electrostatic and an electrolytic treater coupled in series in accordance with the teachings of the present invention.
Figure 2:
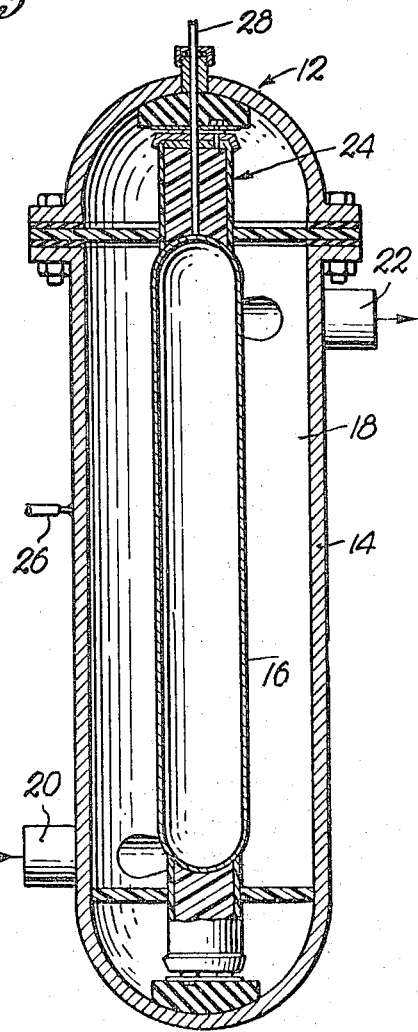

Referring initially to FIGS. 1 and 2, the electrostatic treater 10 and the electrolytic treater 12 (designated "flocculator" in FIG. 1) have, for purposes of illustration only, been shown as substantially identical to the treater in FIG. 8 of my aforesaid U.S. Letters Patent 3,585,122, except for the fact that the electrolytic treater 12 has neither of its electrodes insulated from the treating fluid. Accordingly, said patent is hereby incorporated by reference into the present specification for a full and clear understanding of the construction of treaters 10 and 12 and their basic principles of operation, including the behavior of the water molecules and impurity particles when subjected to the electrostatic field.

Basically, as set forth in said patent, each treater 10 and 12 has a metal outer shell 14 which forms an outer electrode and an inner, tubular electrode 16 which is concentrically disposed within outer electrode 14 in spaced relationship thereto to define an annular treating region 18 located between an inlet 20 and an outlet 22 of the outer electrode 14. It is to be noted that the inlet 20 and outlet 22 of treaters 10 and 12 are reversed from those of the treater in FIG. 8 of my aforesaid patent, such that fluid entering treaters 10 and 12 is forced to flow upwardly against the effects of gravity through treating region 18. The inner electrode 16 is supported within outer electrode 14 by insulated mounting structure 24 at opposite ends of inner electrode 16 which spaced the respective ends of electrode 16 a greater distance from the corresponding ends of electrode 14 than the distance between electrodes 14 and 16 within treating region 18. In this manner, the electrostatic field created within the treater 10 is concentrated solely within treating region 18. Further enhancing the concentration of the electrostatic field of treater 10 within treating region 18 is the fact that the opposed ends of electrode 16 as well as those of electrode 14 are dome shaped or hemispherical in configuration, thereby precluding the existence of charge-concentrating surfaces at these locations. Suitable conductors 26 and 28 are connected to electrodes 14 and 16 respectively and are coupled across a source of electrical potential to charge the electrodes 14 and 16.

The basic distinction between treaters 10 and 12 lies in the electrical action imparted to the fluid flowing therethrough. In the case of treater 10, either of its electrodes 14 and 16 (preferably electrode 16) is insulated from the fluid flowing within region 18 so that no electrolysis occurs. The fluid is subjected only to an electrostatic field which is established by virtue of the insulation surrounding electrode 16, which may be any suitable dielectric material 30 but is preferably Teflon. On the other hand, neither of the electrodes 14 and 16 of the treater 12 is insulated from fluid within region 18 and therefore, electrolysis does occur as electrons are free to flow within the fluid between the electrodes 14 and 16.

Because of the electrolysis which is established within treater 12, plating out of impurity particles within the fluid such as water being treated would occur on either or both of the electrodes 14 and 16 were it not for the existence of the electrostatic treater 10 connected in series with treater 12 upstream from the latter. Amazingly, the residual effects of the electrostatic treater 10 on the fluid being treated are such that the impurity particles do not migrate to either of the electrodes 14 and 16 of treater 12, but instead attract only one another at a more rapid rate than would be possible with treater 10 alone, hence greatly accelerating nucleation and flocculation of the particles.

After passing through the treating region 18 of treater 12, the fluid is discharged through outlet 22 for subsequent passage through a filter or settling basin 32 wherein the flocculated particles may be easily removed from the solution to leave the latter in a condition in which it is substantially free to dissolved solids.

It has further been found during experimentation with the treaters 10 and 12 that selective removal of particles such as solids dissolved in a solution may be carried out by utilizing various materials for the inner electrodes 16 according to the type of substance to be withdrawn from solution. For example, it has been determined that in almost all situations, galvanized iron is suitable for outer electrode 14, but that the inner electrode 16 may be constructed from iron, aluminum, copper or other materials. Clay, which is among the most difficult of all dissolved solids to remove from a water solution, may best be flocculated using an aluminum inner electrode. Manifestly, if a solution contains a number of different impurities, they may be removed selectively by connecting a number of the electrolytic treaters 12 in a series downstream from the electrostatic treater 10, with each of the electrolytic treaters 12 having an inner electrode 16 constructed of a material which is selected for its particular effects on the particles in solution.

It will be appreciated that the treating system above described may be used in a number of varying applications wherever particle removal is desired. For example, the treating system may be employed for purposes of pollution control wherein the effluent from an industrial facility must be disposed of safely. By passing the effluent through the treaters 10 and 12 and subsequently a filter or settling basin 32, the "cleansed" solution may subsequently be discharged into a stream while the removed particles may then be buried or reclaimed for other purposes.

Figure 3:
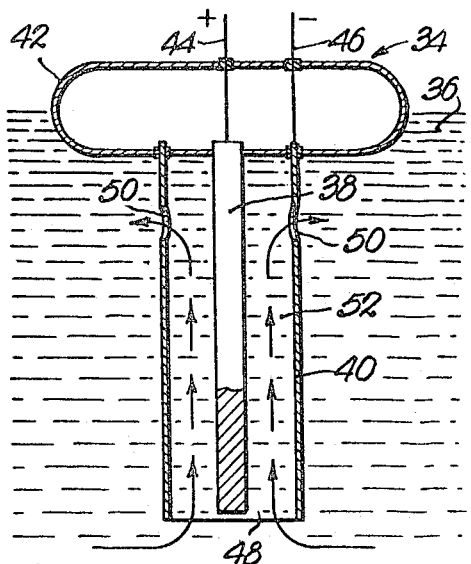
FIG. 3 is a second embodiment of the electrolytic treater forming a part of the present invention which is adapted for flotation within a settling pond or basin.

FIG. 3 shows another embodiment of the treater 12 in which an electrolytic treater 34 is designed for flotation within a settling pond, basin, or other body 36 of liquid. In this version the noninsulated, inner and outer electrodes 38 and 40 respectively are suspended in concentric relationship from an insulating float 42 through which a pair of conductors 44 and 46 extend for connection to the inner electrode 38 and outer electrode 40 respectively.

Electrodes 38 and 40 are submerged within the body of liquid 36, and outer electrode 40 is open at its bottommost end forming a liquid inlet 48 and has a number of liquid outlet holes 50 spaced above inlet 48 so that the liquid moves by natural flow upwardly through treating region 52 between electrodes 38 and 40 and out outlet holes 50.

In this manner, liquid which has initially passed through an electrostatic treater such as the treater 10 may subsequently be discharged into the settling pond containing the body 36 of liquid, whereupon the liquid may receive the effects of treater 34. The flocculated particles will migrate to the bottom of the pond, while the cleared solution thereabove may be withdrawn for subsequent re-cycling; or it may simply be discharged into suitable streams or the like for disposing of the solution. Preferably, a number of the floating treaters 34 are disposed within the body of liquid 36, depending upon the size of the latter.

It has also been discovered that the strong residual action effected by the electrostatic and electrolytic treaters exemplified by treaters 10 and 12 permits the treating of a relatively small, secondary stream of fluid and subsequent discharge of such secondary stream into the primary stream, instead of coupling treaters 10 and 12 directly with the main stream. In this manner, it is unnecessary to construct treaters 10 and 12 of sizes which will enable them to handle a massive flow of fluid, such as existing in the main water lines of a city or town. Instead, they may be substantially reduced from this size which, of course, results in cost savings in terms of construction, installation and maintenance. No dilution of the flocculating action has been detected in systems wherein treating of a secondary stream in this manner has been utilized.

Figure 4:
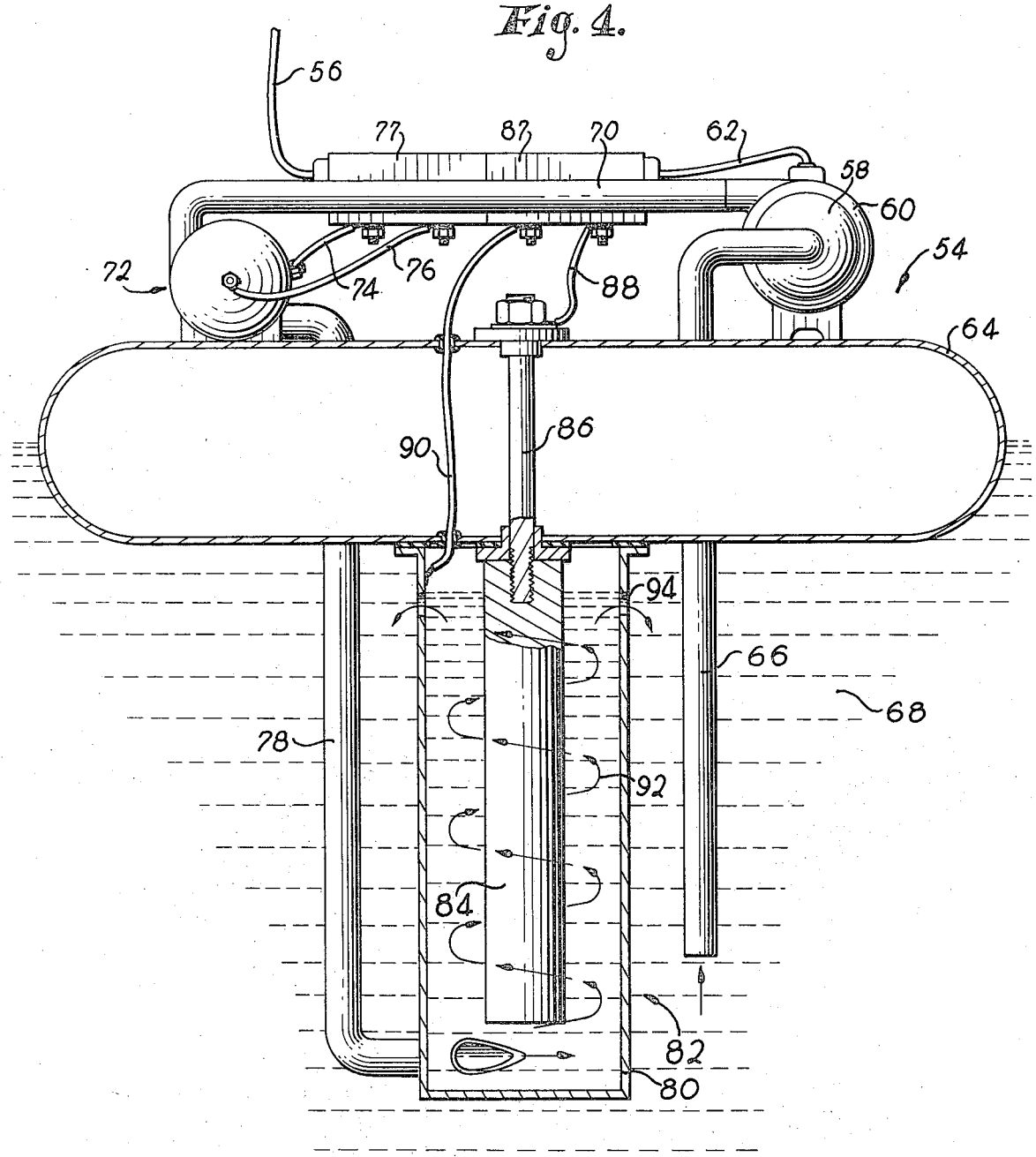
FIG. 4 is a view showing another embodiment of the system wherein both treaters are mounted on a single float disposed within a settling pond or basin.

FIG. 4 shows another device 54 wherein, contrary to the arrangement in FIG. 3 where only the electrolytic treater is float-mounted, both the electrostatic and electrolytic treaters are float-mounted so that the resulting device 54 is virtually self-contained, with the exception of power cable 54 leading thereinto.

A pump 58 has a motor 60 directly coupled with cable 56 through a lead 62 to operate at line voltage and is positioned on float 64 with an intake tube 66 projecting downwardly into the body of fluid 68. The pump 58 draws fresh fluid upwardly through tube 66 and forces it laterally through a delivery tube 70 into the electrostatic treater 72 on the opposite side of float 64 that is similar in construction and operation to treater 10. Treater 72 is connected by leads 74 and 76 to a power unit 77 that takes power from cable 56 and converts it into high voltage, low current output for treater 72. After the fluid has been passed through the electrostatic treater 72, it leaves the latter through a discharge tube 78 which extends downwardly through float 64 to a point adjacent the lowermost, entry end of intake tube 66.

At this level, the discharge tube 78 tangentially intersects a closed bottom, cylindrical, hollow member 80 forming the outer electrode of the electrolytic treater 82 of the device 54. An inner, bare electrode 84 is housed concentrically within and in spaced relationship to outer electrode member 80, the inner electrode 84 being supported by a fastener assembly 86 that extends completely through float 64 and is electrically conductive.

A second power unit 87 beside unit 77 is connected to cable 56 and converts the supplied power to low voltage, high current output for treater 82, there being a pair of leads 88 and 90 from electrodes 84 and 80 respectively to unit 87.

As illustrated by the arrows 92, the fluid which enters outer electrode 80 at its lowermost end is swirled upwardly around inner electrode 84 until reaching a series of outlet holes 94 circumferentially spaced around member 80 at the upper end thereof. The fluid which has been swirled upwardly through treater 82 is exposed to the electric field of the latter and receives the same effect as in treater 12 in order to flocculate particles that have been neutralized by the electrostatic treater 72 upstream from the electrolytic treater 82.

Of importance is the fact that by swirling the fluid upwardly through treater 82, the fluid is exposed to the electric field therewithin for a greater amount of time than would be the case if the fluid were merely forced in straight-line fashion upwardly through treater 82. This increased dwell time is of particular benefit where oily substances are in existence within the fluid and are to be removed therefrom. After flowing out of outlet holes 94 with the "cleansed" fluid, the flocculated substances readily settle to the bottom of the pond or basin.

Having thus described the invention, what is claimed as new and desired to be secured by Letters Patent is:

1. Apparatus for electrically treating fluids including:
   an electrostatic treater having a pair of spaced apart, oppositely charged electrodes for subjecting a fluid passed therebetween to an electrostatic field to neutralize particles contained within the fluid and initiate nucleation,
   at least one of said electrodes being electrically insulated from the fluid to prevent electrical current flow; and
   an electrolytic treater coupled with said electrostatic treater downstream from the latter for boosting the rate of nucleation of said particles by electrolysis to cause flocculation of the nucleating particles,
   said electrolytic treater having a pair of oppositely charged, spaced apart, bare electrodes exposed to the fluid to establish an electrical current flow in the fluid passed therebetween.

2. Apparatus as claimed in claim 1, wherein is further included a filter coupled with said electrolytic treater downstream from the latter for removing the flocculated particles from the fluid.

3. Apparatus as claimed in claim 1, wherein is further included a settling basic coupled with said electrolytic treater downstream from the latter for removing the flocculated particles from the fluid.

4. Apparatus as claimed in claim 1, wherein said electrolytic treater includes a float supporting the electrodes thereof for disposition in a body of liquid to be treated.

5. Apparatus as claimed in claim 4, wherein said electrodes of the electrolytic treater are housed one within the other, the outer electrode of the pair having a liquid inlet and a liquid outlet spaced above said inlet for natural flow of the liquid through the treater when its electrodes are submerged.

6. Apparatus as claimed in claim 1, wherein said electrodes of the electrostatic treater are housed one within the other with electrode portions disposed outside the region of fluid flow through the treater, the spacing between the two electrodes within the treating region being less than the distance from said electrode portions to any other conductive parts of the treater and said portions being devoid of charge-concentrating surfaces.

7. Apparatus as claimed in claim 1, wherein is further included a float adapted to be disposed within a body of liquid to be treated, said treaters both being mounted on said float.

8. Apparatus as claimed in claim 7, wherein said float is provided with a pump for circulating liquid through said treaters.

9. Apparatus as claimed in claim 7, wherein the electrodes of each treater are housed one within the other, each treater having inlet means arranged to swirl the liquid through the treaters around each inner electrode whereby to increase the exposure time of the liquid within the treaters.

* * * * *